United States Patent
Schmidt et al.

(10) Patent No.: US 9,614,201 B2
(45) Date of Patent: Apr. 4, 2017

(54) SEALING ELEMENT FOR SEALING BATTERY CELLS OF A TRACTION BATTERY, MOLDED BODIES FOR MANUFACTURING THE SEALING EELEMENT AND METHOD FOR MANUFACTURING THE SEALING ELEMENT

(71) Applicant: Dr. Ing. h.c. F. Porsche Aktiengesellschaft, Stuttgart (DE)

(72) Inventors: Tim Schmidt, Ludwigsburg (DE); Dominik Grass, Bietigheim-Bissingen (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 14/841,909

(22) Filed: Sep. 1, 2015

(65) Prior Publication Data
US 2016/0064704 A1    Mar. 3, 2016

(30) Foreign Application Priority Data
Sep. 2, 2014 (DE) .......................... 10 2014 112 626

(51) Int. Cl.
*H01M 2/08* (2006.01)
*B29C 41/14* (2006.01)
(Continued)

(52) U.S. Cl.
CPC ............... *H01M 2/08* (2013.01); *B29C 41/14* (2013.01); *B29K 2101/12* (2013.01);
(Continued)

(58) Field of Classification Search
CPC .. H01M 2/08; H01M 2/1077; H01M 2220/20; B29C 41/14; B29L 2031/7146; B29K 2101/12; B29K 2995/0082
See application file for complete search history.

(56) References Cited

U.S. PATENT DOCUMENTS

| 9,293,747 | B2 * | 3/2016 | Chellew ................ H01M 2/105 |
| 2010/0285346 | A1 | 11/2010 | Graban et al. |

(Continued)

FOREIGN PATENT DOCUMENTS

DE    10 2009 057 494    6/2011

OTHER PUBLICATIONS

German Search Report of May 6, 2015.

*Primary Examiner* — Stewart Fraser
(74) *Attorney, Agent, or Firm* — Gerald E. Hespos; Michael J. Porco; Matthew T. Hespos

(57) ABSTRACT

A sealing element (10) for sealing battery cells (18) of a battery module (34) for the purely electric drive of a motor vehicle has a first sealing disk (12) for a seal-forming attachment between a housing (32) and a first attachment frame (44), a second sealing disk (14) spaced from the first sealing disk (12) for a seal-forming attachment between the housing (32) and a second attachment frame (46), and receptacle pockets (16), connecting the first and second sealing disks (12, 14) for accommodating battery cells (18) therein. The first and second sealing disks (12, 14) and the receptacle pockets (16) are manufactured in one piece from a common sealing material. Thus, the battery cells (18) can be sealed with respect to a cooling medium that flows through the housing (32) thereby avoiding the risk of electrical short-circuits via the cooling medium.

6 Claims, 3 Drawing Sheets

(51) Int. Cl.
 *B29K 101/12* (2006.01)
 *B29L 31/00* (2006.01)
 *H01M 2/10* (2006.01)

(52) U.S. Cl.
 CPC .......... *B29K 2995/0082* (2013.01); *B29L 2031/7146* (2013.01); *H01M 2/1077* (2013.01); *H01M 2220/20* (2013.01)

(56) References Cited

U.S. PATENT DOCUMENTS

2012/0237846 A1 9/2012 Brodmann et al.
2013/0337299 A1* 12/2013 Sugawara ............ H01M 2/206
 429/61

\* cited by examiner

SEALING ELEMENT FOR SEALING BATTERY CELLS OF A TRACTION BATTERY, MOLDED BODIES FOR MANUFACTURING THE SEALING EELEMENT AND METHOD FOR MANUFACTURING THE SEALING ELEMENT

CROSS REFERENCE TO RELATED APPLICATION

This application claims priority under 35 USC 119 to German Patent Appl. No. 10 2014 112 626.2 filed on Sep. 2, 2014, the entire disclosure of which is incorporated herein by reference.

BACKGROUND

1. Field of the Invention

The invention relates to a sealing element for sealing battery cells of a traction battery, to a molded body for manufacturing the sealing element and to a method for manufacturing the sealing element, by means of which battery cells of a battery module for the purely electric drive of a motor vehicle can be sealed with respect to a cooling medium that cools the battery cells to avoid an electrical short-circuit of the battery cells via the cooling medium.

2. Description of the Related Art

US2010/0285346 A1 discloses a battery module in which battery cells are each inserted in metal pockets around which a cooling medium can flow. Flanges protrude laterally from the metal pockets and are pressed against a housing by a cover to prevent the cooling medium from escaping from the housing at the flanges, past the battery cells.

There is a continuous need to increase the efficiency of battery modules without increasing their failure probability.

The object of the invention is to provide a battery module with a high efficiency and a low failure probability.

SUMMARY

The invention relates to a sealing element for sealing battery cells of a battery module for the purely electric drive of a motor vehicle. The sealing element has a first sealing disk arranged essentially in a plane for seal-forming attachment between a frame-shaped housing and a first attachment frame. A second sealing disk is arranged essentially in a plane at a distance from the first sealing disk for the seal-forming attachment between the frame-shaped housing and a second attachment frame. Hollow receptacle pockets connect the first sealing disk to the second sealing disk. One battery cell is accommodated in each hollow receptacle case. The first and second sealing disks and the receptacle pockets are manufactured in one piece from a common sealing material.

The frame-shaped housing can be arranged between the sealing disks. Thus, a three-dimensional volume is formed between the housing and the sealing element to accommodate a flow of a cooling medium, such as cooling water, for cooling the battery cells in the receptacle pockets. In this context, it is possible to provide merely two sealing points to be sealed. The one sealing point can be formed along the contour of the frame-shaped housing between the housing and the first sealing disk. The second sealing point can be formed along the contour of the frame-shaped housing between the housing and the second sealing disk. As a result it is possible to seal a multiplicity of battery cells with respect to the cooling medium with just a single sealing element, thereby reducing the expenditure on mounting. In particular the risk of insufficiently sealed battery cells can be reduced compared to sealing each individual battery cell. The sealing faces can be provided in a region in which the sealing unit cannot be affected adversely by, for example, tolerance-induced offset of components. The sealing disks and the wall thickness of the housing may be selected to be sufficiently large that a sufficiently high level of tightness is achieved even in the case of components that are oriented inprecisely with respect to the housing. A failure probability of the battery cells caused by the ingress of cooling medium into the battery cell can thereby be reduced. The poles of the battery cells can project on the same side or on different sides of the receptacle pocket and electrical contact can easily be made using electric contacting means without the cooling medium reaching the poles and being able to cause a short-circuit.

A wall of the battery cell that forms the outer lateral surface of the battery cell is not in direct contact with the cooling medium. As a result, the battery cell is spaced apart from the cooling medium by the sealing material of the receptacle pocket. The sealing material can of the receptacle pocket may have a small material thickness. Thus, the exchange of heat between the battery cell and the cooling medium is not affected adversely to a significant degree. As a result of which a correspondingly high cooling power of the battery cells can be achieved, permitting particularly efficient operation of the battery cells. It is not necessary to bring about an exchange of heat between the battery cells and the cooling medium via further intermediately connected, heat-conducting components. Therefore, the cooling power can be correspondingly high. Additionally, the efficiency of the battery cells and hence the battery module are increased. At the same time, the sealing material of the receptacle pocket can act as an electrically insulating dielectric. Accordingly, there is no need to electrically insulate the cell wall within the battery cell from the poles of the battery cell. Instead, the cell wall can form a pole of the battery cell or can be electrically connected to a pole. This permits the electrical storage capability of the battery cell to be increased by eliminating and/or reducing electrical insulation of the cell wall with the same installation space. As a result, the efficiency of the battery module can be increased further in a way that is essentially neutral in terms of the installation space. The sealing element is a three-dimensional structure with receptacle pockets for the battery cells, and it is possible to seal the battery cells with respect to a cooling medium that flows through the housing with low structural expenditure and a good sealing effect by means of only two sealing points on the sealing disks. Hence, a high cooling power for the battery cells can be achieved without the risk of electrical short-circuits via the cooling medium so that a battery module with a high efficiency and a low failure probability is made possible.

The sealing element can be manufactured from a sealing material that can be flexible, stretchable, compressible and/or elastic. For example, the sealing material can be manufactured from silicone, latex, polychloroprene, natural and/or synthetic rubber, nitrile rubber (NBR) and/or thermoplastic elastomer.

The receptacle pocket may form a first through-opening in the first sealing disk and/or a second through-opening in the second sealing disk. As a result, the battery cell can be inserted into the receptacle pocket and/or pulled out therefrom via the first through-opening and/or the second through-opening. The receptacle pocket can be closed in the manner of a pouch in the region of the first sealing disk or the second sealing disk. The receptacle pocket may extend continuously from the first through-opening to the second through-opening and may be opened on both ends. As a result, a first pole of the battery cell can be guided through the first outlet opening, and a second pole of the battery cell can be guided through the second outlet opening. Thus, plural planes of battery cells can be arranged one on top of the other and placed in electrical contact with one another.

The first and second sealing disks may be essentially parallel to one another, and the receptacle pockets may extend essentially perpendicular to the first and second sealing disk. As a result it is possible to configure the sealing element in a symmetrical fashion with the result that when the sealing element is rotated through 180° it has the same shape again. As a result, a specific necessary installation position of the sealing element is avoided, thereby simplifying the mounting.

The receptacle pocket may be hollow and substantially cylindrical to accommodate round battery cells. As a result, a specific circumferential position of the battery cell relative to the sealing element is not necessary, thereby facilitating mounting.

The invention also relates to a battery module for purely electric drive of a motor vehicle. The battery module has an essentially frame-shaped housing with oppositely facing first and second circumferential end faces and a sealing element that can be embodied in the manner described above. The sealing element bears circumferentially with a first sealing disk on the first end face and a second sealing disk on the second end face. Battery cells are inserted respectively into receptacle pockets. A first attachment frame may be connected to the housing so that the first sealing disk is pressed in a seal-forming fashion between the housing and the first attachment frame. A second attachment frame may be connected to the housing so that the second sealing disk is pressed in a seal-forming fashion between the housing and the second attachment frame. An inlet is provided for introducing a cooling medium into the housing for cooling the battery cells, and an outlet is provided for discharging the cooling medium from the housing. The sealing element is formed in a three-dimensional fashion with the receptacle pockets for the battery cells and seals the battery cells with respect to a cooling medium that flows through the housing with low structural expenditure and a good sealing effect by means of only two sealing points on the sealing disks. Thus, a high cooling power for the battery cells can be achieved without the risk of electrical short-circuits via the cooling medium, thereby achieving a battery module with a high efficiency and a low failure probability. Each sealing disk can be pressed securely between the assigned end face and the attachment frame by connecting the attachment frame to the housing with a corresponding pressing force by screwing, riveting, clamping or the like. The sealing frame can be unitary with a larger structural unit, for example a cover of the battery module.

The battery module may be accommodated in a planar fashion with a press fit by the receptacle pocket. Thus, a thermally insulating air gap between the battery cell and the sealing material of the sealing element can be avoided. As a result, good transmission of heat between the battery cell and the cooling medium can be achieved.

The invention also relates a molded body for manufacturing a sealing element, such as the above-described sealing element which. The molded body may have first and second base plates for bounding first and second opposite surfaces of the first sealing disks, and core bodies connected to the first and/or second sealing disks for forming a cavity in the receptacle pockets. The molded body can constitute a negative mold with respect to the sealing element. The sealing element can be manufactured using the molded body and is formed in a three-dimensional fashion with receptacle pockets for the battery cells. The battery cells can be sealed with respect to a cooling medium that flows through the housing with low structural expenditure and a good sealing effect by only two sealing points from the sealing disks. As a result, a high cooling power for the battery cells can be achieved without a risk of electrical short-circuits via the cooling medium to achieve a battery module with a high efficiency and a low failure probability. To manufacture the sealing element, the core bodies and the opposed inner sides of the base plates can be coated with the sealing material that is present essentially in the liquid state. The core bodies can be released from the sealing element after the curing of the sealing material. The faces of the molded body that point toward the sealing element may be coated with a separating agent to simplify the relative movement of the plates and the core bodies with respect to the sealing element and to avoid the sealing material of the sealing element adhering to the molded body.

Each core body can be connected in a repeatedly detachable fashion to the first or second base plate. The core bodies may be connected at one end in a non-detachable fashion to the first or second base plate. In particular, all of the core bodies may be connected at the same end in a detachable fashion to the one plate and in a non-detachable fashion to the other plate. As a result, the plate that can be detached from the core bodies can be moved away from the sealing element in an axial direction of the receptacle pockets. The plate that is connected to the core bodies can be moved away from the sealing element in an opposed axial direction of the receptacle pockets. The core bodies can be removed together with this plate from the receptacle pockets.

The invention also relates to a method for manufacturing a sealing element, such as the above-described sealing element, using a molded body, such as the above-described molded body. The method includes coating the core bodies and the inner sides of the first and second base plate with an essentially liquid sealing material and then curing the sealing material to a solidified state. The method then includes releasing the first base plate and/or the second base plate from the core bodies, releasing the first base plate from the first sealing disk, and releasing the second base plate from the second sealing disk. The method then includes pulling the core bodies out from the receptacle pockets together with the first and/or second base plates. The sealing element made by the method is three-dimensional and has receptacle pockets for the battery cells. The battery cells can be sealed with respect to a cooling medium that flows through the housing with low structural expenditure and a good sealing effect by only two sealing points on the sealing disks. As a result, a high cooling power for the battery cells can be achieved without the risk of electrical short-circuits via the cooling medium to provide a battery module with a high efficiency and a low failure probability.

The coating of the first and second base plates and the core bodies may be carried out by dipping the molded body into an essentially liquid sealing material. In particular, if the sealing material has low viscosity in the liquid state, and is therefore rather pasty, the coating using the dipping can be carried out easily. The molded body can be dipped into a bath with liquid sealing material and then pulled out of the bath. Subsequently, it is then possible to wait until excess sealing material has flowed off the molded body and/or the sealing material on the surfaces of the molded body has cured.

The molded body preferably is cooled during the coating. As a result, a cured material layer can be obtained quickly on the cooled surfaces of the molded body.

The invention will now be explained by way of example below with reference to the appended drawings of exemplary embodiments. The features presented below can each represent an aspect of the invention individually as well as in combination.

DETAILED DESCRIPTION

Figure 1:
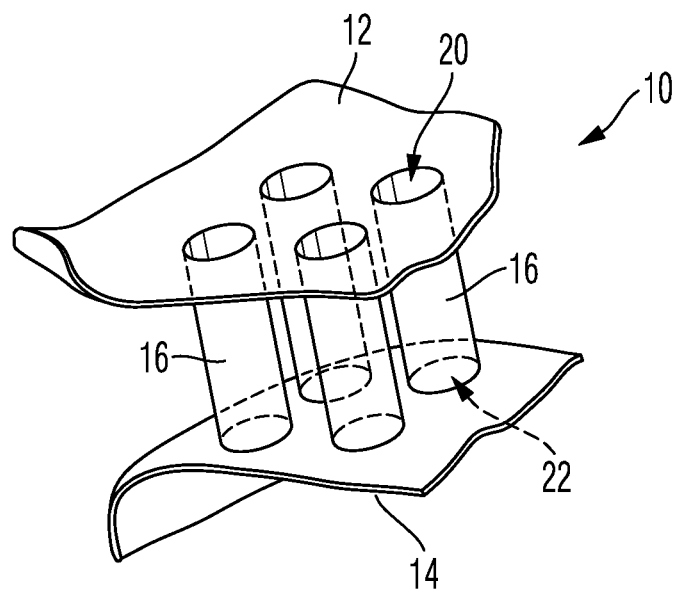
FIG. 1 is a schematic perspective side view of a sealing element.
Figure 2:
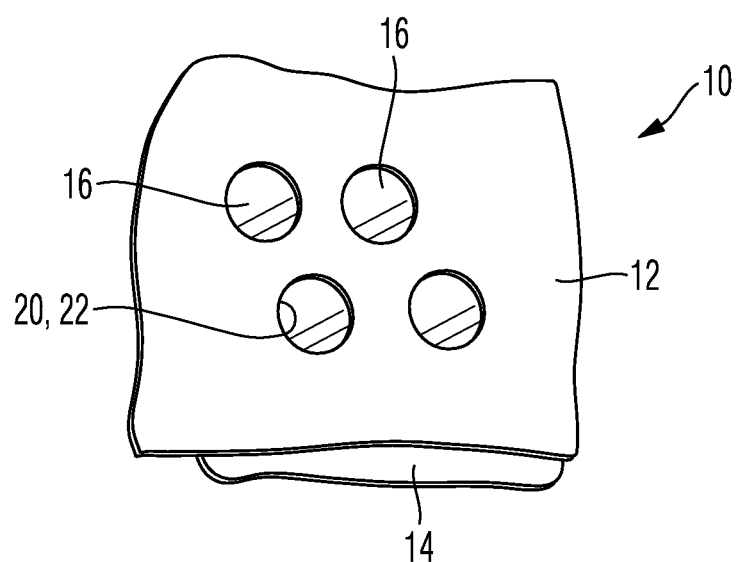
FIG. 2 is a schematic plan view of the sealing element from FIG. 1.

FIGS. 1 and 2 illustrate a sealing element 10 that is manufactured from a flexible sealing material. The sealing element 10 has first and second spaced apart sealing disks 12 and 14 that are connected to one another by hollow-cylindrical receptacle pockets 16 for accommodating round battery cells 18. The receptacle pockets 16 are open on both axial ends. Thus, a first pole of the battery cell 18 can project through a first through-opening 20 in the first sealing disk 12, and a second pole of the battery cell 18 can project through a second through-opening 22 in the second sealing disk 14.

Figure 3:
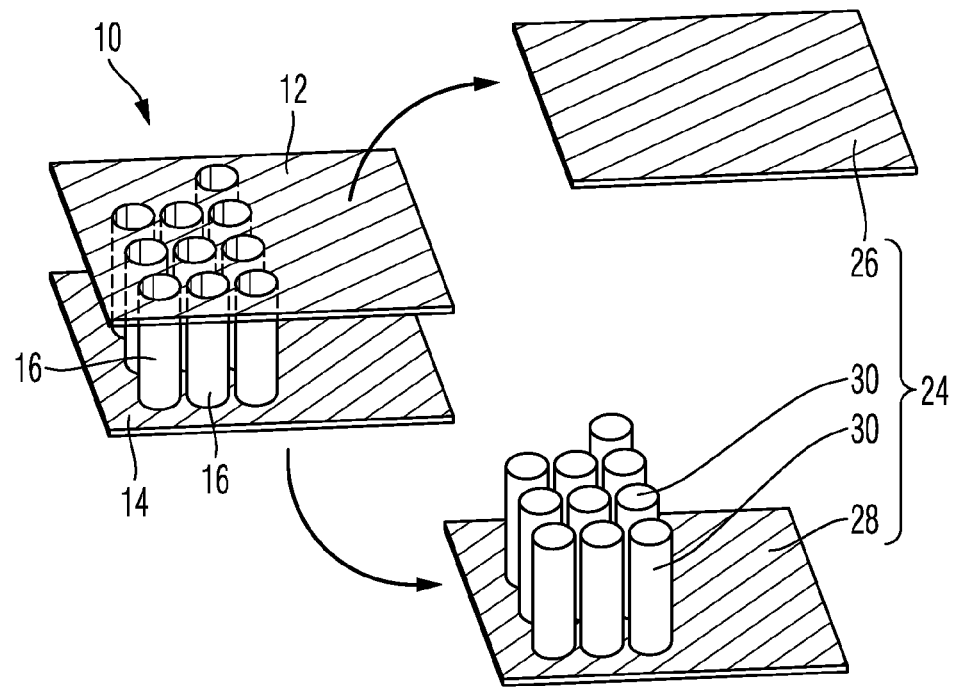
FIG. 3 is a schematic perspective view of the sealing element of FIG. 1 during manufacture.

As illustrated in FIG. 3, the sealing element 10 can be configured as a detached coating of a molded body 24 that is configured as a negative mold of the sealing element 10. The molded body 24 has a first base plate 26 that bounds the first sealing disk 12, and a second base plate 28 that bounds the second sealing disk 14. The sealing disks 12, 14 are connected to one another by core bodies 30 that bound the respective receptacle pocket 16. In the illustrated embodiment, the core bodies 30 are detachably connected to the first base plate 26. Thus, after the dipping of the molded body 24 into liquid sealing material and curing the sealing material on the coated surface of the molded body 24, the molded body 24 can be released from the sealing element 10 in two parts without damaging the sealing element 10.

Figure 4:
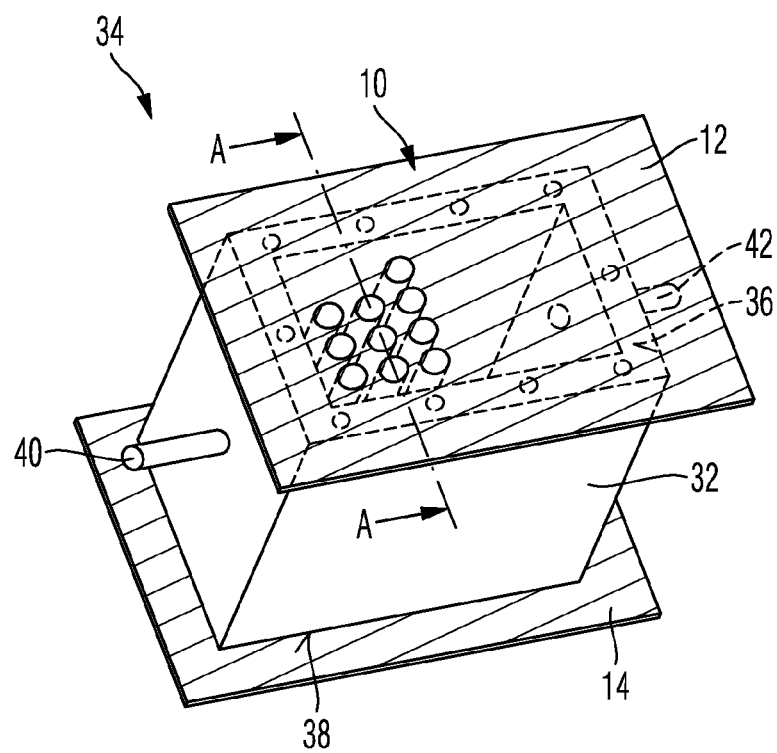
FIG. 4 is a schematic perspective view of a battery module having the sealing element of FIG. 1.
Figure 5:
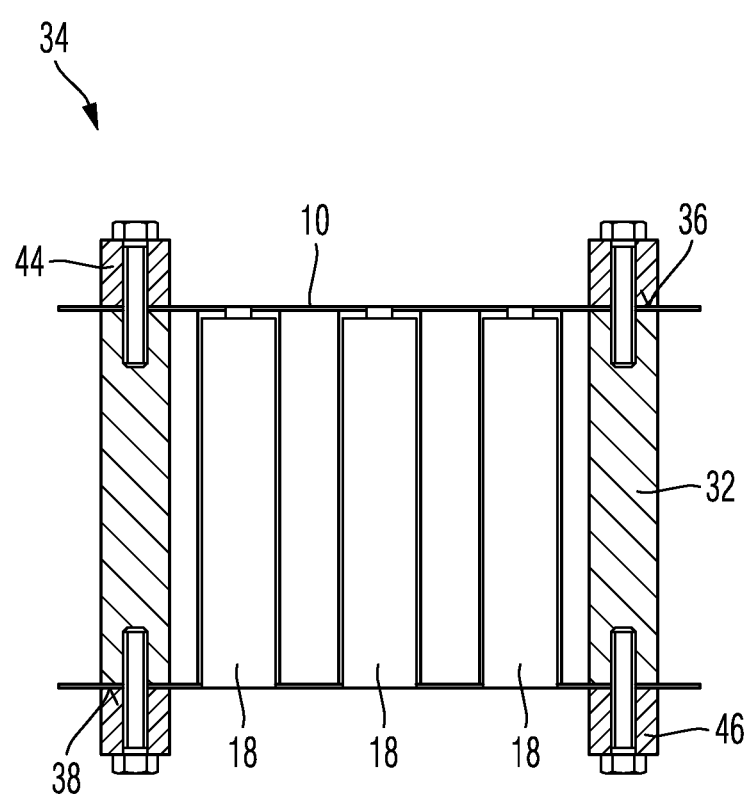
FIG. 5 is a schematic section view of the battery module of FIG. 4.

As illustrated in FIGS. 4 and 5, the flexible sealing element 10 can be fit into a frame-shaped housing 32 of a battery module 34. As a result, the first sealing disk 12 can bear in a planar fashion on an upward pointing first end face 36 of the housing 32. At the same time, the second sealing disk 14 can bear in a planar fashion on a downwardly pointing second end face 38 of the housing 32. The housing 32 can have an inlet 40 for feeding in a cooling medium and an outlet 42 for discharging the cooling medium. Thus, the battery cells 18 are protected by the material of the sealing element 10 and can be cooled with a high cooling power. In this context, the first sealing disk 12 of the sealing element 10 can be pressed in a fluid-tight fashion against the first end 36 of the housing 32 using a first attachment frame 44 screwed to the housing 32, and the second sealing disk 14 of the sealing element 10 can be pressed in a fluid-tight fashion against the second end 38 of the housing 32 using a second attachment frame 46 screwed to the housing 32. As a result, only two sealing points are produced between the housing 32 and the attachment frames 44, 46 for the sealing element 10 to seal with respect to the cooling medium with all of the battery cells 18 inserted into the receptacle pockets 16 of the sealing element 10.

What is claimed is:

1. A sealing element for sealing battery cells of a module for a purely electric drive of a motor vehicle, comprising:
    a first sealing disk arranged essentially in a plane for a seal-forming attachment between a frame-shaped housing and a first attachment frame;
    a second sealing disk arranged essentially in a plane at a distance from the first sealing disk for a seal-forming attachment between the housing and a second attachment frame; and
    a plurality of receptacle pockets connecting the first sealing disk to the second sealing disk, the receptacle pockets being hollow and configured respectively for accommodating the battery cells, wherein
    the first and second sealing disk and the receptacle pockets are manufactured in one piece from a common sealing material.

2. The sealing element of claim 1, wherein the receptacle pocket forms a first through-opening in the first sealing disk and/or a second through-opening in the second sealing disk.

3. The sealing element of claim 2, wherein the first and second sealing disks are substantially parallel to one another, and the receptacle pockets are substantially perpendicular to the first and second sealing disks.

4. The sealing element of claim 1, wherein each of the receptacle pockets is a hollow-cylinder configured to accommodate round battery cells.

5. A battery module for the purely electric drive of a motor vehicle, comprising:
    a frame-shaped housing having first and second oppositely facing circumferential end faces;
    the sealing element of claim 1 disposed so that the first sealing disk bears circumferentially on the first end face and the second sealing disk bears circumferentially on the second end face;
    battery cells inserted respectively into the receptacle pockets;
    a first attachment frame connected to the housing so that the first sealing disk is pressed in a seal-forming fashion between the housing and the first attachment frame;
    a second attachment frame connected to the housing so that the second sealing disk is pressed in a seal-forming fashion between the housing and the second attachment frame;
    an inlet for introducing a cooling medium for cooling the battery cells into the housing; and
    an outlet for discharging the cooling medium from the housing.

6. The battery module of claim 5, wherein the battery cells are accommodated in a plane with a press fit by the receptacle pockets.

* * * * *